United States Patent [19]

DeLuca et al.

[11] Patent Number: 4,498,648
[45] Date of Patent: Feb. 12, 1985

[54] CARGO DOOR ASSEMBLY

[75] Inventors: Frank T. DeLuca, Marietta; Gordon A. Dobson, Woodstock, both of Ga.

[73] Assignee: Lockheed Corporation, Burbank, Calif.

[21] Appl. No.: 507,964

[22] Filed: Jun. 27, 1983

[51] Int. Cl.³ ............................ B64D 9/00; B64C 1/22
[52] U.S. Cl. .................................................. 244/118.3
[58] Field of Search ............... 244/118.1, 118.3, 129.5, 244/129.6, 137 R; 49/37, 40, 79, 279, 366, 367, 368, 369, 394

[56] References Cited

U.S. PATENT DOCUMENTS

| | | | |
|---|---|---|---|
| 2,942,812 | 6/1960 | Pauli | 244/118.3 |
| 3,128,068 | 4/1964 | Pauli | 244/118.3 |
| 3,147,942 | 9/1964 | Griffith | 244/118.3 |
| 4,140,291 | 2/1979 | Evans et al. | 244/118.3 |
| 4,395,000 | 7/1983 | Deviny et al. | 244/118.3 |

*Primary Examiner*—Galen L. Barefoot
*Attorney, Agent, or Firm*—Eric R. Katz

[57] ABSTRACT

The cargo door assembly (17) of the present invention is located in the aft end of an aircraft fuselage (11) and comprises a cargo ramp (19) and cargo door (21) with a hinged pressure bulkhead (23) together with operating linkage and locks coordinated for sequential operation whereby access to the pressurized aircraft interior (15) is possible for on and off loading of cargo while the aircraft is in flight or on the ground. The structural components of the door assembly (17) are entirely of the plug-type design and when closed, locking and sealing are effected in a manner to prevent premature and inadvertent depressurization of the interior.

12 Claims, 17 Drawing Figures

CARGO DOOR ASSEMBLY

TECHNICAL FIELD

The present invention generally relates to doors for transport type aircraft to facilitate the movement of goods and cargo on and off of the aircraft, and more particularly to a versatile cargo door assembly having a simple plug-type configuration and a passive locking system providing a safe pressurization structure.

BACKGROUND ART

In loading and unloading cargo on and off large transport aircraft, maximum efficiency has been obtained through end loading, i.e., loading and unloading through one end of the aircraft. While front end loading has been utilized, more often the aft or tail of the fuselage is the preferred location for a cargo door assembly. Such end loading eliminates turning and maneuvering operations otherwise necessary; however, special problems are created in the design and construction of the fuselage adjacent the fuselage as well as in the design, construction and operation of the closures or doors for such openings.

For ground loading and unloading, a simple hinged door or doors that swing outwardly have been employed in order to gain unobstructed access to the interior of the aircraft at or near its maximum transverse dimension. As the size of the aircraft increases, this becomes more difficult since the open door must be properly supported to withstand not only its own weight, but also air loads and winds to which it may be subjected. In the past this has been satisfied largely through the use of doors that consist of multiple sections, such as the so-called clam shells or the like. Although this type of construction increases the overall complexity of the door and its operation, it has been the preferred approach rather than add weight to the aircraft by reinforcement of the door and the adjacent supporting structure. However, this added complexity in structure and operation can lead to ineffective operation, high maintenance requirements and increased failure rates.

In modern day high speed cargo aircraft, it is desirable to provide substantially straight-in loading and unloading of cargo on the ground as well as the capability of aerial delivery of cargo loads as large as the effective cross-sectional area of the cargo compartment. When greater performance of this type is required, the above-noted design problems are compounded. Large openings make it necessary to reinforce the adjacent stationary structure to assure its integrity during the aerial delivery operation, and hence add weight to the aircraft. With multiple section door assemblies, the extreme contour condition of the fuselage end has resulted in relatively complex structures and mechanisms for synchronizing the movement of the door sections. Often times, this requires the use of numerous limit switches which reduce the reliability of operation and increase the opportunity for malfunction.

In addition to the aforementioned considerations, pressurization of the aircraft interior during high altitude flights presents further difficulties such as the pressurization of unusable volumes of space plus leakage through cargo doors in the outer fuselage structure. In order to maintain the cargo door in a closed position during pressurization, gang locking arrangements are employed. One particular problem with the use of gang locking arrangements is the inability of the operator to obtain a visual inspection of the condition of the lock. This requires the reliance on mechanical devices to assure that a locked condition has been achieved, thus increasing complexity and reducing reliability. The failure to adequately lock the cargo door of a pressurized aircraft can have disastrous results if a door should blow-out which can cause extensive damage to the aircraft it not a fatal crash.

DISCLOSURE OF THE INVENTION

Accordingly, it is an object of the present invention to provide a cargo door assembly having a simple structure which provides for straight-in loading and unloading of cargo on the ground as well as the capability of aerial delivery of cargo loads.

It is another object of the present invention to provide a cargo door assembly having a simple structure affording improved reliability of operation as well as a reduction of maintenance requirements and failure rates.

A further object of the present invention is to provide a cargo door assembly having a passive locking system eliminating the need for moving parts, allowing for the visual inspection of the condition of the locks and increasing the safety of operation.

Yet another object of the present invention is to provide a cargo door assembly wherein all structural units are inward opening, plug-type doors which offer a safe pressurization structure.

One feature of the present invention is the storage of a ramp extension over the cargo door when the ramp extension is not in use.

One feature and a significant advantage of the present invention is that all locks can be visually inspected thereby reducing the reliance on mechanical means to verify the existance of a locked condition.

Another advantage of the present invention is that the simple structure of the cargo door assembly increases the usable pressurized cargo capacity volume of the aircraft.

Yet another advantage of the present invention is the simplicity of operation and rigging thus eliminating the need for numerous limit switches and excessive rigging requirements thereby minimizing the opportunity for personnel errors.

A further important advantage of the present invention is the elimination of the duality function of the ramp extension as a pressure door.

Essentially, the door assembly of the present invention is located in the aft end of an aircraft fuselage and comprises a cargo ramp and cargo door with a hinged pressure bulkhead together with operating linkage and locks coordinated for sequential operation whereby access to the pressurized aircraft interior is possible for on and off loading of cargo while the aircraft is in flight or on the ground. The structural components of the door assembly are entirely of the plug-type design and when closed, locking and sealing are effected in a manner to prevent premature and inadvertent depressurization of the interior.

In accordance with the present invention there is provided a plug-type door assembly for the storage compartment of a cargo aircraft having a fuselage including a cargo ramp pivotally mounted for longitudinal movement as well as outward and downward rotation from a closed position to first, second, and third positions; ramp actuator means for lowering and raising the cargo ramp; and ramp locking means for locking the ramp in the closed position. A folding ramp extension is also provided as well as extension locking means for selectively attaching the extension to the cargo ramp. Located aft, along the fuselage, of the cargo ramp, is a cargo door pivotally mounted for inward and upward rotation from a closed position to an open position. The cargo door includes an extension stowing means for stowing the ramp extension in a stored condition when not in use as well as cargo door locking means for locking the door in the closed position. A hinged pressure bulkhead has one end attached to the torque deck of the storage compartment with the other end movably affixed to the cargo door. Bulkhead actuator means are included for folding and opening the bulkhead so as to lift and lower the door. Sealing means are also included for forming a pressure tight seal at the ramp, door, pressure bulkhead and fuselage intersection. This assembly allows for truck bed loading, aerial deployment of cargo and low altitude parachute extraction of cargo when the ramp is in the first position, co-planar with the deck of the storage compartment, the ramp extension stowed and the door is open. Drive-in loading and off-loading is afforded with the ramp and ramp extension fully deployed in the third position and the door open, while combat/speed off-loading is achieved with the ramp and ramp extension in the second position and the door open. The ramp and door are positioned in the closed configuration for sealing the storage compartment.

The ramp locking means, according to the present invention, includes a clevis hinge half having slotted holes, the clevis hinge half being affixed to the bulkhead of the fuselage of the aircraft. A complementary blade hinge half is affixed to the forward end of the ramp and includes an aperture adapted to receive a pin for attaching the blade and clevis hinge halves, thus permitting the ramp to move longitudinally as well as pivotally with respect to the fuselage. A series of hooks are attached to the ramp and a series of complementary hook engaging means are attached to the fuselage adjacent the fuselage-ramp intersection, each hook engaging means being provided for slidably engaging one of the hooks. A ramp traversing means is also included for moving the ramp forward and rearward so that the ramp actuator means lifts the cargo ramp against the fuselage while the ramp traversing means moves the ramp rearward. This rearward movement results in the disengagement of the hooks from the complementary hook engaging means to free the ramp for downward rotation to the first, second, and third positions.

Cargo ramp hinge lock pins, in accordance with the present invention, are included for engaging aligned apertures provided through the clevis and blade hinge halves for locking the ramp in the full open and closed positions. A means for engaging and disengaging the hinge lock pins is included for locking and unlocking the ramp.

In accordance with the present invention the ramp actuator means includes a hydraulic actuator for raising and lowering the ramp, ramp position control links each having a guide, and tethering means for selectively varying the length of the ramp position control links. The tethering means preferably comprises a control pin for selectively engaging one of a series of apertures along each of the guides to form a stop for the link to abut so that with the pin inserted in a first position, the ramp is co-planar with the floor of the cargo compartment and in a second aperture to orient the ramp for combat/speed off loading.

In accordance with the invention, the door locking means includes a series of hooks attached to the door and a series of complementary hook engaging means attached to the fuselage adjacent to the fuselage-door intersection, each hook engaging means being provided for engaging one of the hooks. A door engaging locking pin is attached to the aft portion of the ramp for engaging an aperture through the door to lock the same when in the closed position. Also included is a bulkhead engaging pin, attached to the fuselage, for engaging and locking the bulkhead in the unfolded or open position.

The bulkhead actuator means, in accordance with the present invention, includes a cargo door roller assembly on the door engaging-end of the bulkhead, a cargo door actuation track on the door for engaging and guiding the roller assembly along the track, and a hydraulic actuator hinged at one end to the fuselage and at the other end to the bulkhead. This arrangement permits the retraction of the actuator to fold the bulkhead which causes the roller assembly to move along the actuation track thereby lifting the door, the extension of the actuator opening the bulkhead to close the cargo door.

In accordance with the present invention, the ramp extension includes a first plate for connection to the cargo ramp; a bifurcated second plate, hingably affixed to the first plate and forming independently movable first and second toe plates; and a wedge-shaped toe plate attached to each of the toe plates. Self-deploying pads are attached to each toe plate for engaging the ground during drive-in loading and off-loading and a roller assembly is included for ground engagement during combat/speed off-loading. A folding means is provided for folding the first plate towards the second plate during deployment of the extension.

The ramp extension locking means includes ramp extension fittings located on the forward facing portion of the first plate, saddle fittings on the aft portion of the cargo ramp for lockably engaging the plate fitting to selectively lock the extension to the ramp and a means for locking the saddle fittings for engaging and disengaging the extension ramp fittings.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout different views. The drawings are not necessarily to scale, emphasis instead being placed on illustrating the principles of the invention.

BEST MODE FOR CARRYING OUT THE INVENTION

Figure 1:
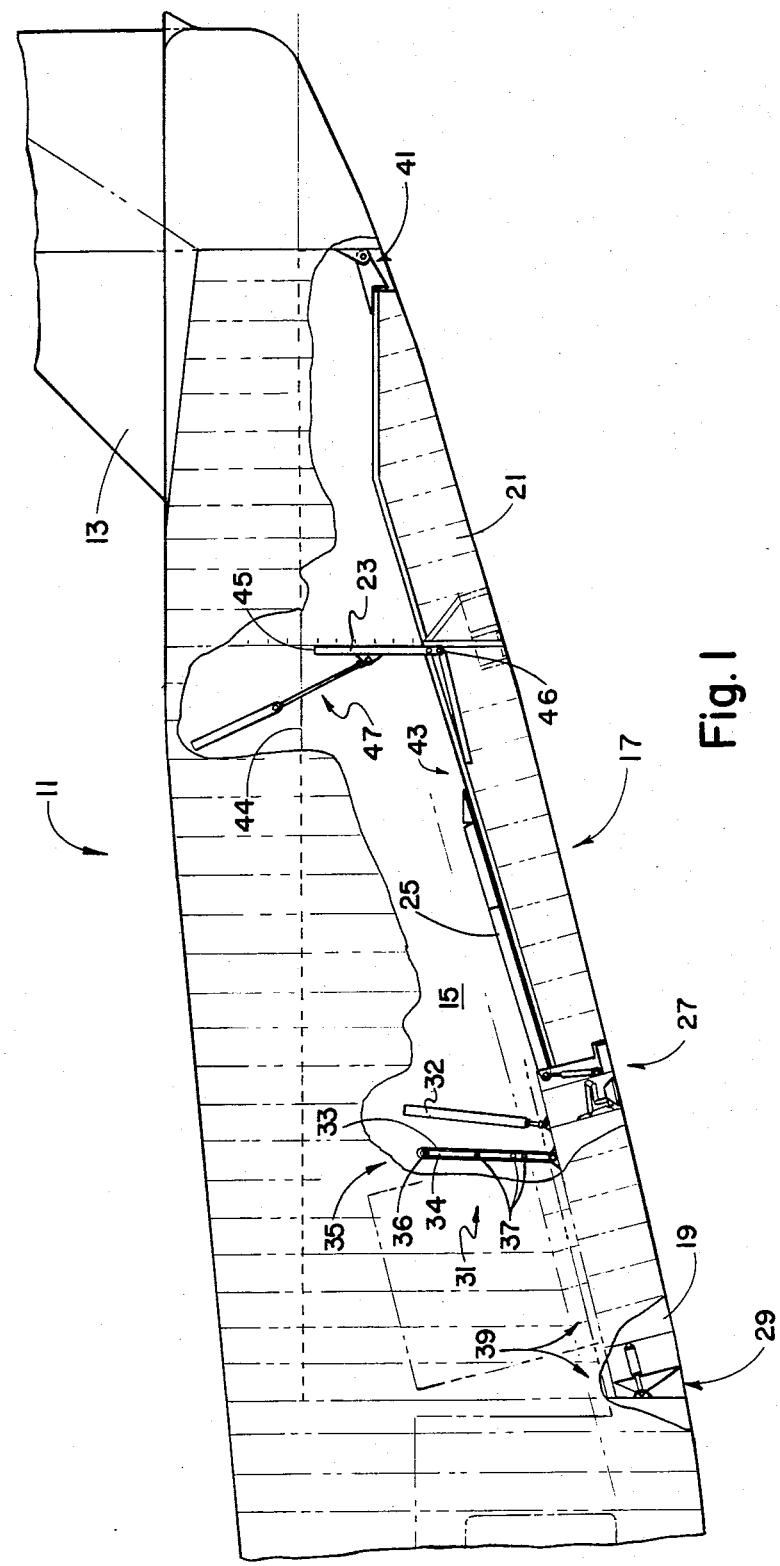
FIG. 1 is a cross-sectional side view of the cargo door assembly of the present invention in the closed position.

Generally stated, the cargo door assembly of the present invention is located in the aft portion of an aircraft fuselage and according to one embodiment the invention is practiced by a cargo ramp and cargo door with a hinged pressure bulkhead together with operating linkage and locks coordinated for sequential operation. This arrangement allows for access to the pressurized aircraft interior for on and off loading of the cargo while the aircraft is in flight or on the ground. The structural components of the door assembly are entirely of the plug-type design and when closed, locking and sealing are effected in a manner to prevent inadvertent and premature pressurization, or depressurization.

Referring more specifically to the drawings, reference numeral 11, generally designates the aft end portion of a typical cargo aircraft, i.e., the fuseage which terminates in an empennage section 13. Internally of the fuselage 11 is a compartment 15 constituting the storage compartment adapted to receive and store cargo for which the aircraft is designed to carry.

In order to facilitate access to the compartment 15 for the on and off loading of cargo, a cargo door assembly, generally indicated at 17, is provided in the fuselage 11 on the underside thereof. The cargo door assembly 17, as illustrated in FIG. 1, is positioned in the closed configuration and comprises a cargo ramp 19, a cargo door 21 and a folding pressure bulkhead 23. Overlying the cargo door 21 is a ramp extension 25 which is adapted to be releasably secured to the cargo ramp 19 by means of an extension locking means, generally indicated at 27, depending upon the intended use of the cargo door assembly 17.

Figure 3:
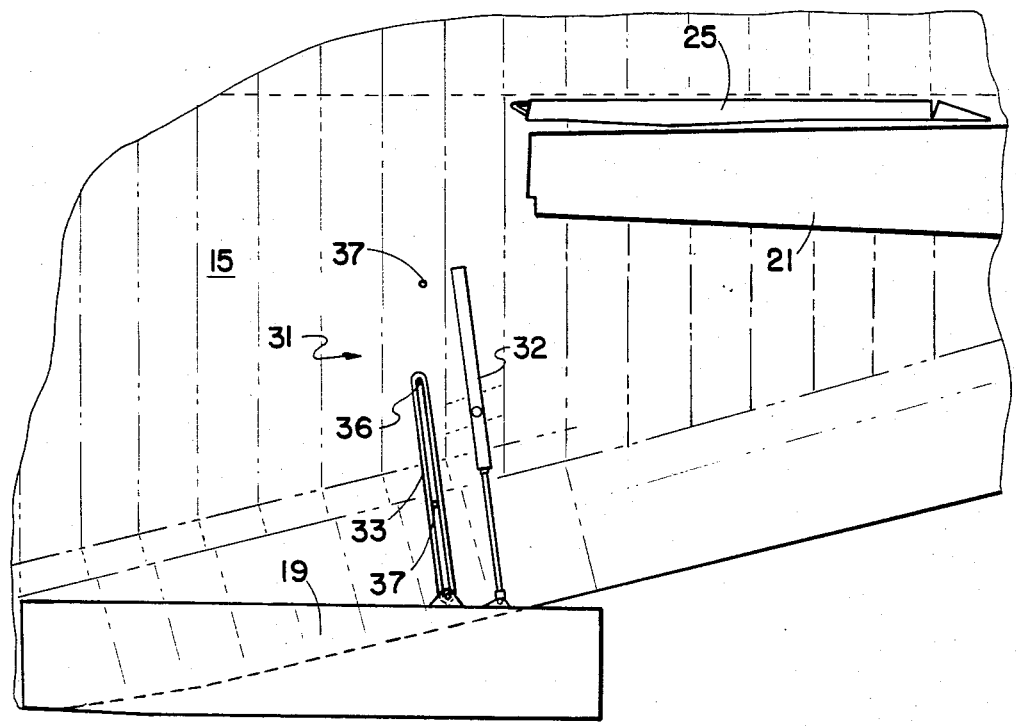
FIG. 3 is a cross-sectional side view illustrating the cargo door assembly of the present invention configured for aerial deployment of cargo or truck bed loading, the ramp extension being in the stowed position above the cargo door.
Figure 4:
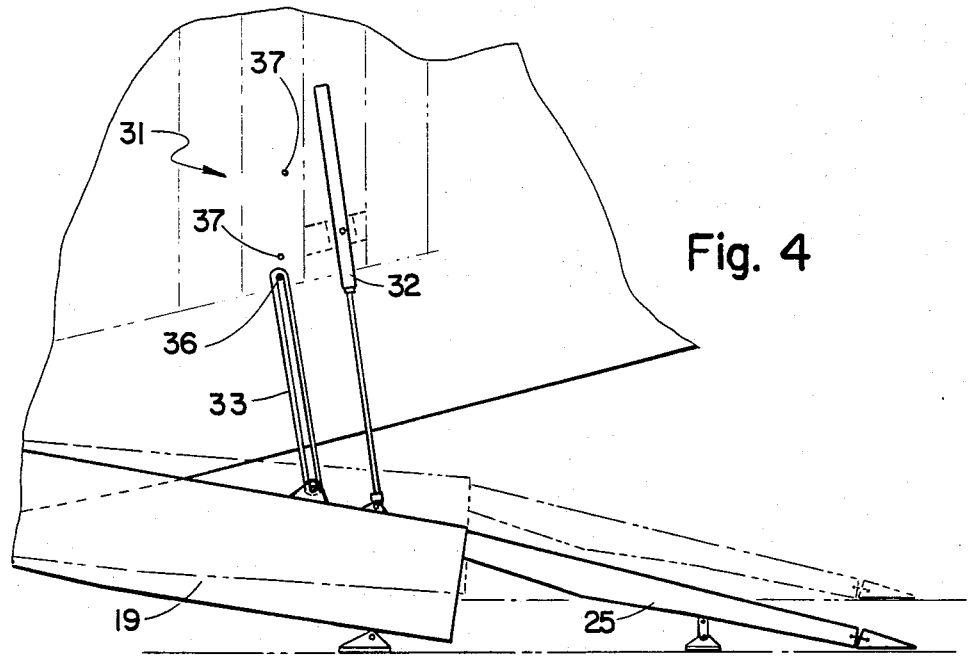
FIG. 4 is a partial, side view showing the ramp configuration for drive-in loading in solid lines and combat speed off-loading in ghost lines.

The cargo ramp 19 is pivotally mounted at 29 for longitudinal as well as outward and downward rotation from a closed position, as illustrated in FIG. 1, to a first position, with the ramp extension 25 stowed above the door 21, for aerial deployment of cargo or truck bed loading as seen in FIG. 3, and to second and third positions, as illustrated by FIG. 4, for combat/speed off-loading and drive-in loading, respectively.

Generally indicated at 31 is a ramp actuator means for lowering and raising the cargo ramp 19. The actuator means comprises a vertical actuator 32 such as a hydraulic cylinder, pivotally attached to one end of the ramp 19, the other end being pivotally attached to the fuselage 11. The vertical actuator 32 lifts and lowers the ramp 19. While a hydraulic cylinder is illustrated, it is understood that any other suitable actuator is employable whether it be electric, pneumatic or hydraulic in nature.

The ramp 19 is guided by ramp position control links 33, each link 33 having a guide 34 and a tethering means, generally indicated at 35, for selectively varying the length of the ramp position control links 33. The tethering means 35 comprises a control pin 36 for selectively engaging one of a series of apertures 37 formed along each of the guides 34 to provide a stop for the links 33 to abut, so as to properly position the ramp 19 depending upon the intended use. Also included is a passive cargo door locking arrangement or means, generally indicated at 39, for locking the ramp 19.

Figure 2:
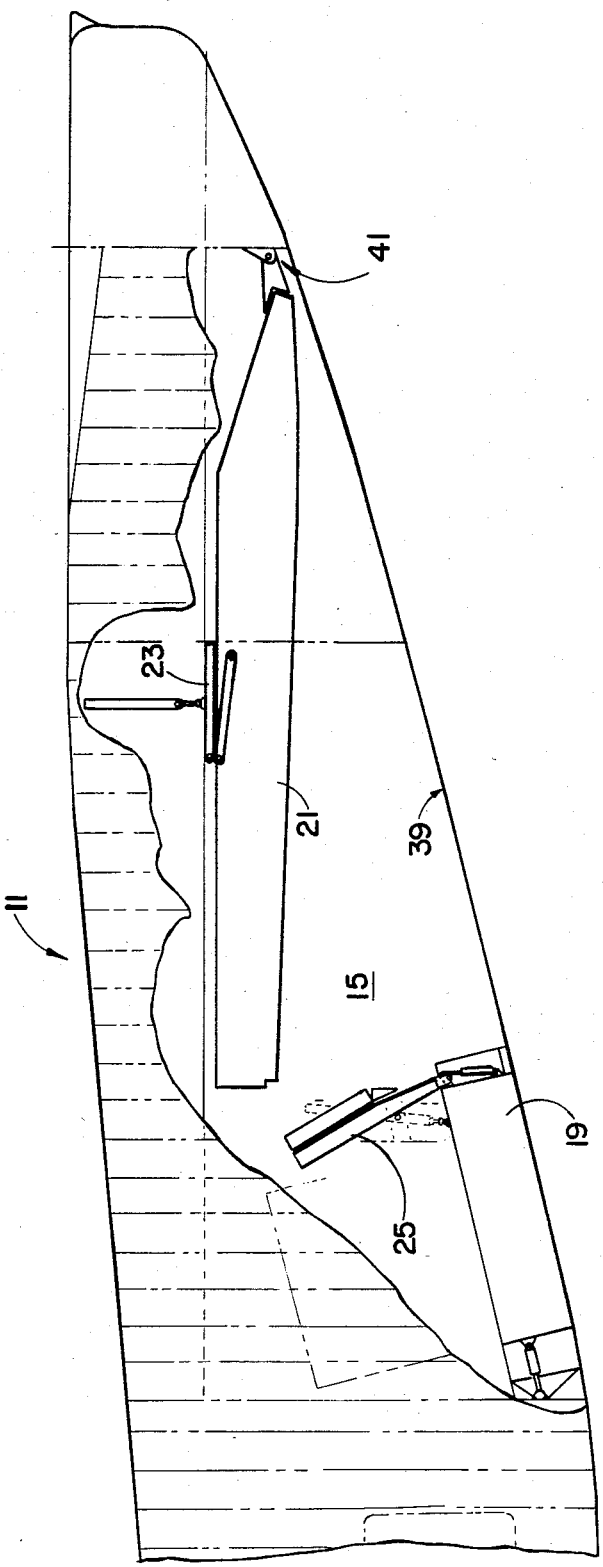
FIG. 2 is a cross-sectional side view of the present invention with the cargo door open and the ramp extension extracted.

As best illustrated by FIG. 2, the cargo door 21 is pivotally mounted, at 41, to the fuselage 11 for inward and upward rotation. The door 21 is positioned aft of the ramp 19 along the fuselage 11 and has an aerodynamically efficient outer configuration as does the ramp 19. Thus, the ramp 19 and door 21, when positioned in the closed configuration shown in FIG. 1, have an outboard contour that forms a portion of the fuselage 11. A door locking means, generally indicated at 43, is included to provide a passive locking arrangement.

Referring to FIGS. 1 and 2, the hinged pressure bulkhead 23 has one end pivotally attached to the torque deck 44 of the storage compartment 15 at 45, the other end being slidably affixed to the door 21 at 46 for longitudinal movement. A bulkhead actuator means, generally indicated at 47, is included for folding and unfolding the bulkhead so as to lift and lower the door.

Also provided is a sealing means for forming a pressure tight seal at the ramp, door, pressure bulkheads and fuselage intersections. Simple, flapper-type seals are employed for pressure sealing at the ramp, door, and pressure bulkhead. Two hinged seals run the length of the ramp to fuselage intersection.

The cargo ramp 19 and door 21 form a movable section of the aft fuselage 11 and are part of the aircraft pressure vessel. This configuration provides straight-in opening of about 210 inches (533.4 cm) wide by about 114 inches (289.56 cm) high in aerial deployment systems (ADS), low altitude parachute extraction systems (LAPES), and truck-bed modes as shown in FIG. 3, and 210 inches (533.4 cm) wide by about 148 inches (375.9 cm) high in the drive-in and combat/speed off-loading configurations shown in FIG. 4.

Figure 5:
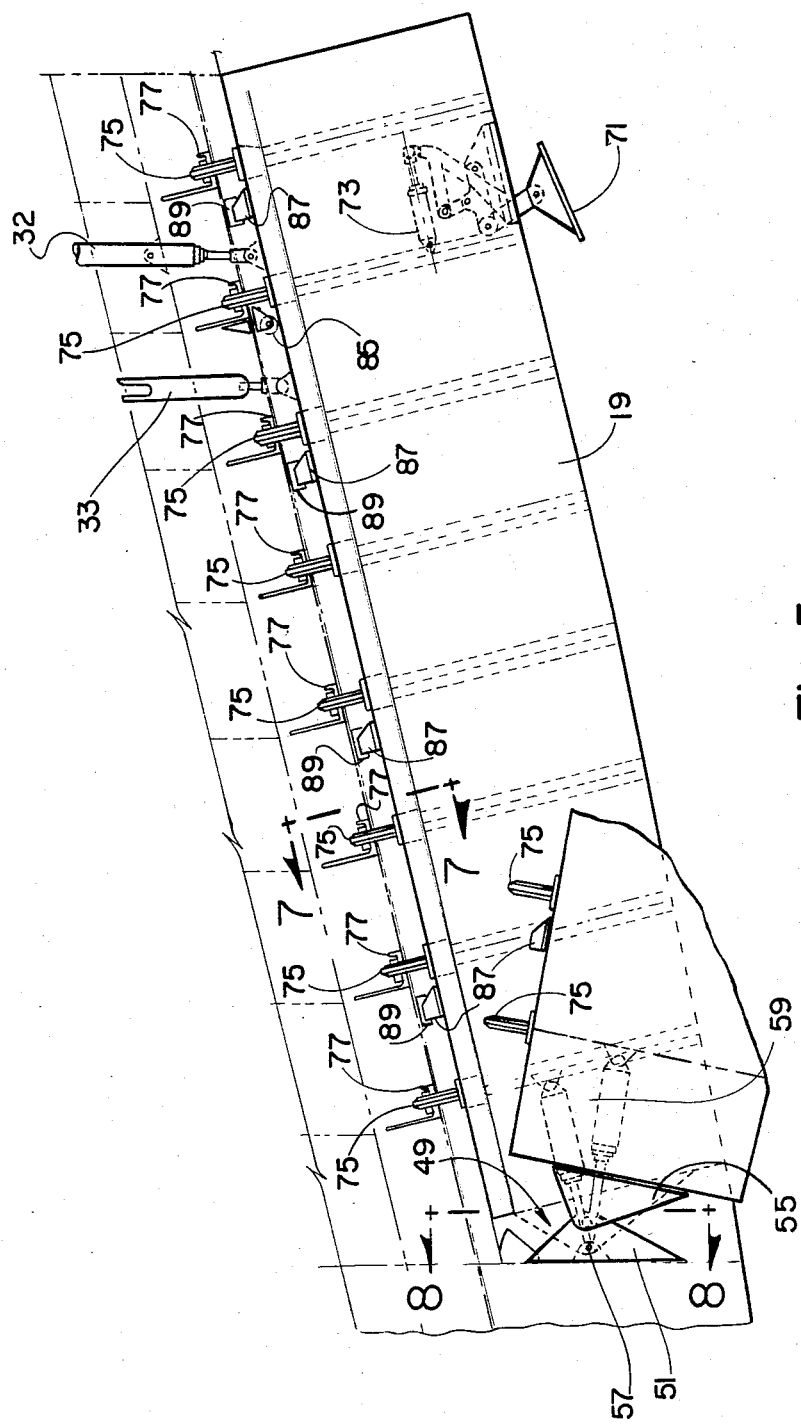
FIG. 5 is a side view of the cargo ramp of the present invention.
Figure 6:
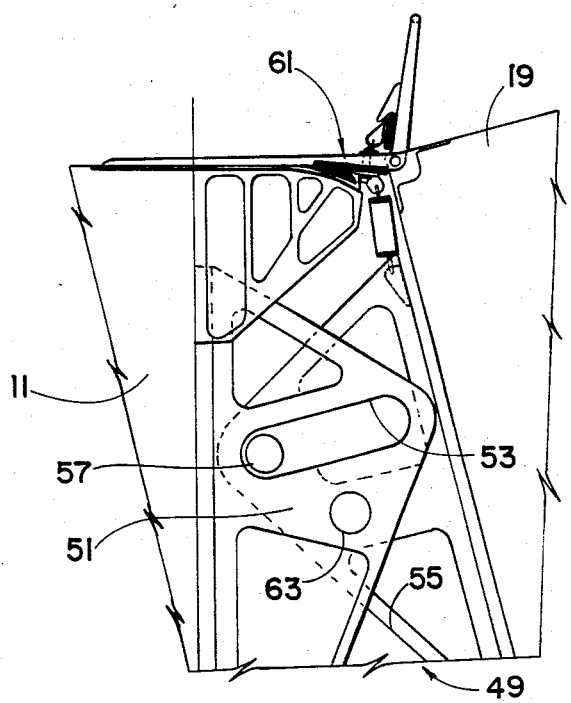
FIG. 6 illustrates the clevis hinge arrangement of the cargo ramp of the present invention.

Referring to FIGS. 5–8, the cargo ramp 19 is connected to the fuselage 11 by means of hinges, generally indicated at 49, which permit longitudinal as well as pivotal movement as is best seen in FIGS. 5 and 6. In the embodiment illustrated, four hinges 49 are employed, however, any other suitable number is contemplated by the invention. Each hinge 49 comprises a clevis hinge half 51, attached to the fuselage 11, each clevis hinge half 51 having a slotted aperture 53. Attached to the forward facing portion of the ramp 19 are complementary blade hinge halves 55 adapted for attachment to the clevis hinge halves 51 by means of a pin 57, each blade hinge half 55 having a round aperture for positioning the pin 57. The slotted holes 53 through the clevis hinge half 51 permit the ramp to move approximately 4 inches (10.16 cm) in a longitudinal direction to facilitate the locking and unlocking of the ramp 19 from the fuselage 11. Ramp traverse actuators 59, such as a hydraulic cylinder or the like, located on each side of the ramp 19, move the ramp aft and forward during the unlocking and locking procedure.

As illustrated by FIG. 6, a ramp-to-fuselage bridge assembly, generally indicated at 61, is attached to the forward edge of the ramp floor. The assembly 61 functions as a traffic plate when the ramp 19 is in the open position and as a pressure seal when the ramp 19 is closed. When required, the bridge assembly 61 is raised to provide visual inspection of the position of ramp hinge lock pins 63.

Figure 7A:
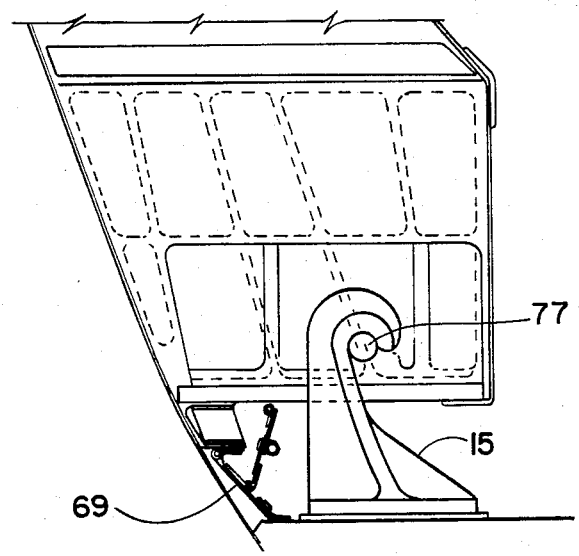
FIG. 7A is a forward view of the ramp locking arrangement taken along lines 7—7 of FIG. 5.
Figure 8:
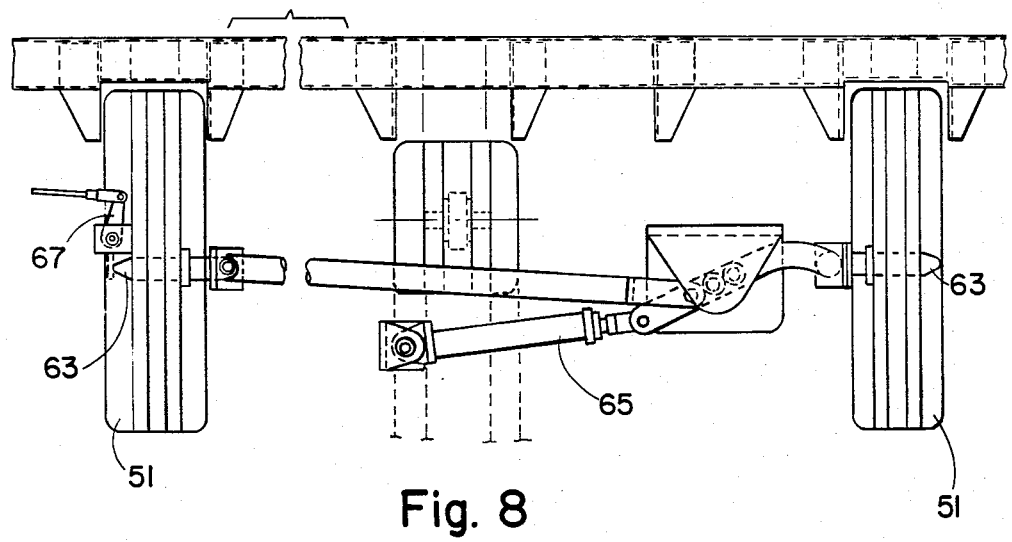
FIG. 8 is a forward view of the hinging arrangement of the cargo ramp taken along lines 8—8 of FIG. 5.

To prevent inadvertent actuation of the ramp 19, ramp hinge lock pins 63 are provided as illustrated by FIG. 8. The pins 63 are adapted to engage aligned holes in the clevis and blade hinge halves when the ramp is in the full open or full closed position. A lock pin actuator 65 drives the pins 63 between the locked and unlocked position and is operatively associated with a bellcrank side seal actuator 67 for closing ramp-to-fuselage side seals 69 as shown in FIG. 7A. Unless the ramp 19 is in the full open or closed position, the hinge lock pins 63 cannot be inserted. This prevents the sealing of the ramp-to-fuselage side seals 69, when the ramp is closed but unlocked, thus precluding the pressurization of the aircraft interior and eliminating a possible blow-out condition. In addition to visual inspection of the pins 63 via assembly 61, the pin position is sensed, such as by limit switches, to control "DOOR LOCKED/DOOR UNLOCKED" warning lights.

Deployable ramp support pads 71 are located on the right and left underside portions of the ramp 19 for supporting the ramp 19 on the ground. When retracted, each ramp support pad 71 is enclosed in a non-pressurized area with rigging and maintenance access being possible from outside of the aircraft. These pads 71 are deployed by sequenced, ported, hydraulic actuators 73 that when deployed are pressure relieved and maintained in the deployed position by an overcenter linkage. The ground contracting surface of each pad 71 is covered with an approved nonstick surface, this surface being approximately 17×17 inches (43×43 cm) in area and adapted to support about 65,000 lbs (30,000 kilograms).

As indicated previously, the ramp 19 is lowered and raised by two vertical hydraulic actuators 32, each actuator 32 being provided with trunnion fittings mounted in the sloping longeron structure. The rod ends of the actuators 32 at the ramp surface are adjustable, the actuators 32 being self-relieving and react no pressure from the structure when the ramp 19 is closed. The actuators 32 are also self-relieved when the ramp 19 is in the full-down, "drive-in" position, where total ramp weight is supported by the ramp support pads 71.

The passive cargo locking means or system 39 employs no moving parts thereby providing a total plug door assembly. The locking system 39 utilizes a series of identical ramp lock hooks 75 affixed along the upper peripheral edge of the ramp 19 as shown in FIG. 5. Complementary hook engaging means or hangers 77 line the inner peripheral edge of the fuselage 11, positioned for engaging the hooks 75 so as to mate the ramp 19 and fuselage 11 in the closed position.

Figure 7B:
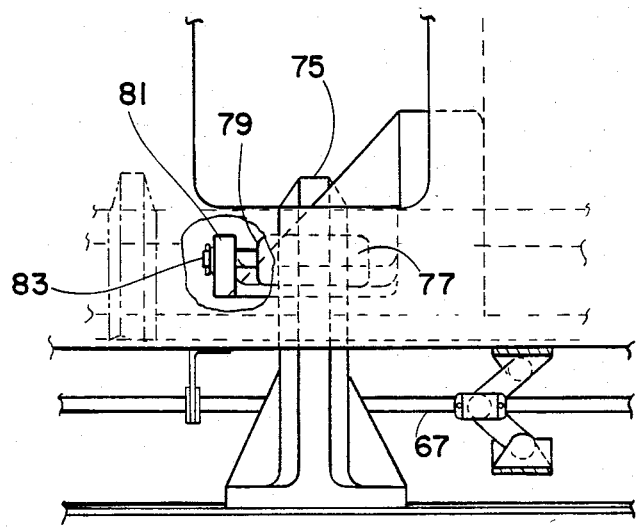
FIG. 7B is a side view of the ramp locking arrangement of FIG. 7A.

Referring to FIGS. 7A and 7B, the hooks 75 are manufactured from heat treated steel to provide improved strength and resistance to wear. The complementary hangers are designed with a separate cylindrical pad 79 of lower heat treated steel resting in a saddle-shaped cradle 81 on the hanger 77. This configuration ensures that any wear takes place on the cylindrical low heat treated steel pad 79. The pads 79 are identical at each lock position and at a preselected pad wear limit, a retainer bolt 83 is removed and the pad 79 replaced with a new one. This installation does not require a re-rigging of the entire system.

The operation of the ramp 19 is straightforward. To unlock and lower the ramp 19, the cargo door 21 is first raised as illustrated by FIG. 2. The vertical hydraulic ramp actuators 32 lift the ramp 19 against the ramp up stop rollers 85, as illustrated by FIG. 5. While held in this position, the traversing hydraulic ramp actuators 59 move the ramp 19 rearwards. This rearward movement slides the hooks 75 off of the complementary hangers 77 thus freeing the ramp 19 for downward rotation to an open position.

During the locking of the ramp 19, the alignment of the outboard contour of the ramp 19 and fuselage 11 is controlled by a series of wedge-shaped fittings 87 positioned on each side of the ramp 19 and along the length thereof. Complementary wedge engaging channels 89 are positioned along the underside of the fuselage 11 so as to engage and guide the wedge-shaped fittings 87 during the closing and locking operation. Each wedge fitting 87 is provided with alignment roller bearings on the upper channel-engaging edge thereof.

During the closing operation, hooks 75 engage hangers 77 so that the ramp 19 fits flush with fuselage 11. This closed position permits the hinge lock pins 63 to engage and lock ramp hinges 49. The actuation of the lock pins 63 moves the bellcrank side seal actuator 67 to the closed position thus sealing pressure seal 69 illustrated in FIGS. 7A–7B.

Referring to FIGS. 3-4, the ramp extension 25 is detachably affixed to the ramp 19 for use during the drive-in and combat/speed off-loading modes as illustrated by FIG. 4. When detached, the ramp extension 25 is stowed above the door 21 below torque deck 44, as shown in FIG. 3, such as during aerial deployment of cargo.

Figure 9:
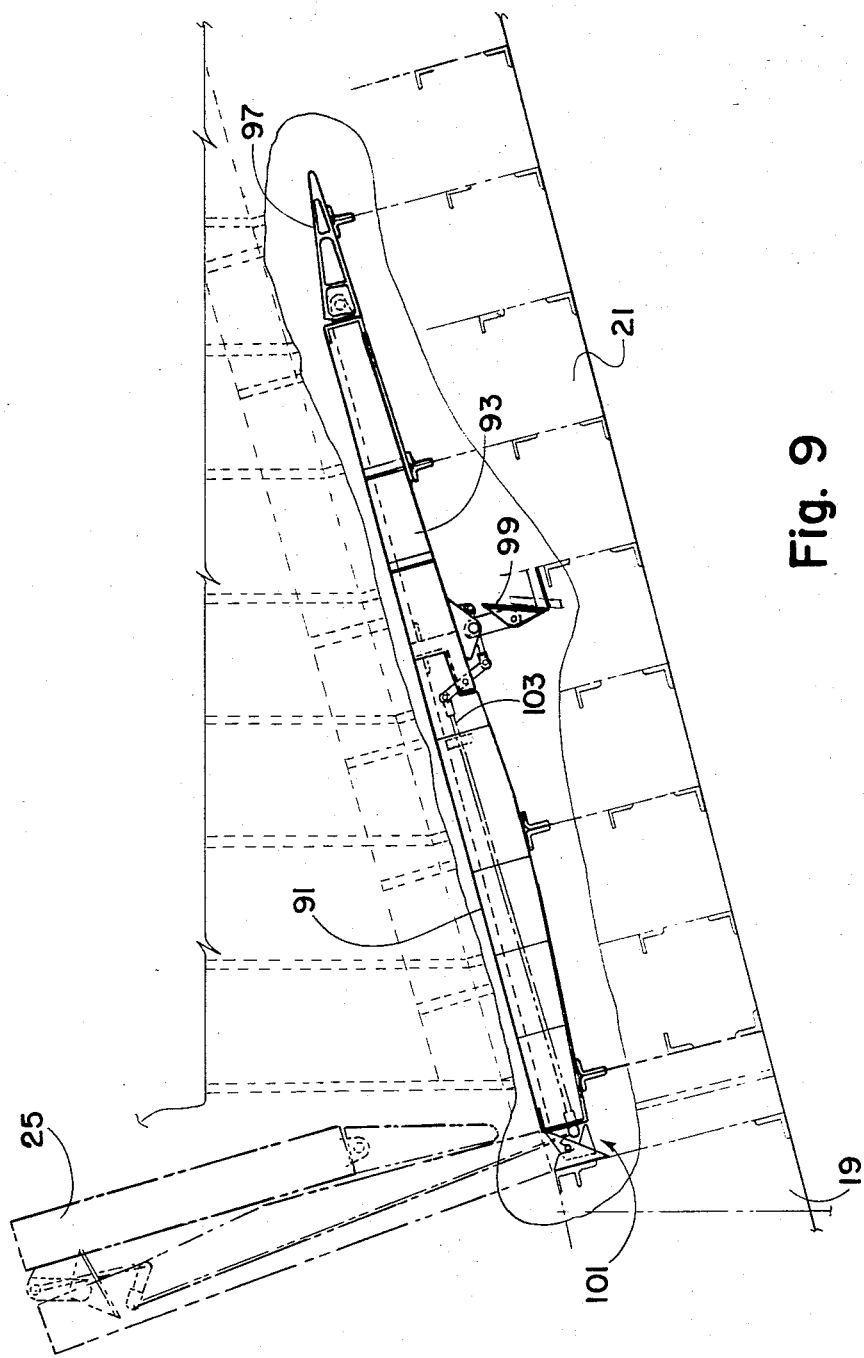
FIG. 9 is a side view, partially in section, illustrating the ramp extension in the stowed position in solid lines and the ramp extension in the intermediate retracted position in ghost lines.

As illustrated by FIG. 9, the extension 25 comprises a first plate 91 for interfacing with the ramp 19 and a bifurcated second plate 93 hingably affixed to the first plate 91. The second plate 93 forms independently movable first and second toe plates 95A and 95B, respectively and attached to each toe plate 95 is a wedge-shaped toe plate 97.

Figure 11:
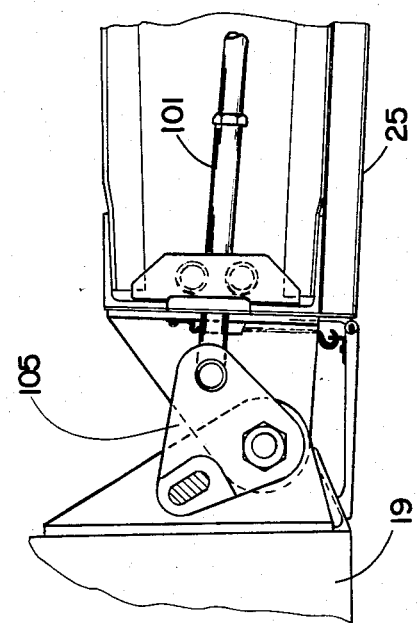
FIG. 11 is a side view illustrating the drive bar-ramp extension lock-unlock mechanism.

The ramp extension 25 is assembled with hinge fittings and pins and includes two self-deploying pads 99 controlled by a spring link attached to fittings on the extension 25. When the ramp extension 25 is to be used, an extension folding mechanism, generally indicated at 101, folds the toe plates 95 towards the first plate 91 as the first plate rotates upwards as shown in FIG. 2. The extension folding mechanism 101 comprises control rods 103 attached at one end to a ramp-to-ramp extension engagement means or rod lock plate 105 and at the other end to the extension 25 at the hinge as shown in FIGS. 9 and 11. The rod lock plate 105 reciprocates as the extension 25 rotates upwards to cause the folding mechanism 101 to fold the second plate 93 toward the first plate 91. When the extension 25 rotates downwards, the toe plates 95A and 95B extend automatically. The independent hinging of toe plates 95A and 95B allows for irregularities in the ground surface.

Figure 10:
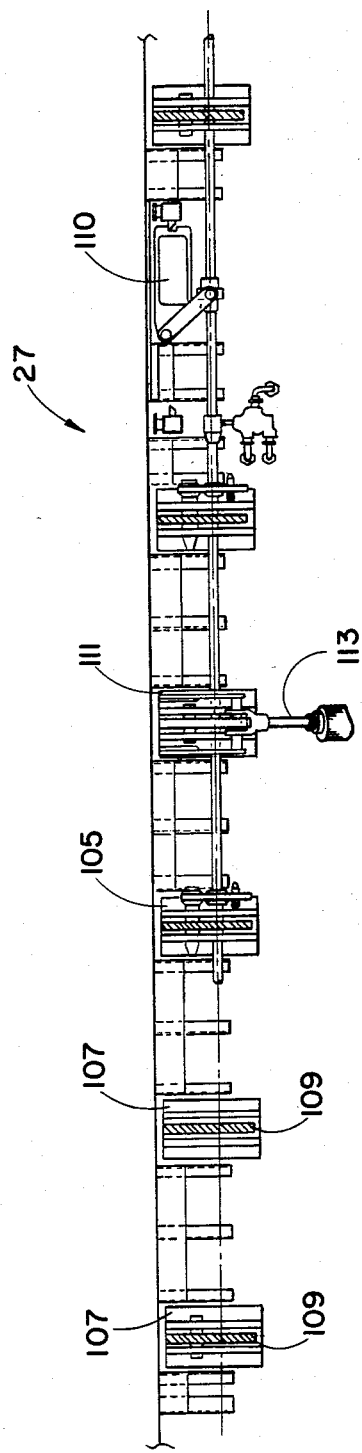
FIG. 10 is a view looking forward illustrating the ramp to ramp extension connection arrangement.
Figure 12:
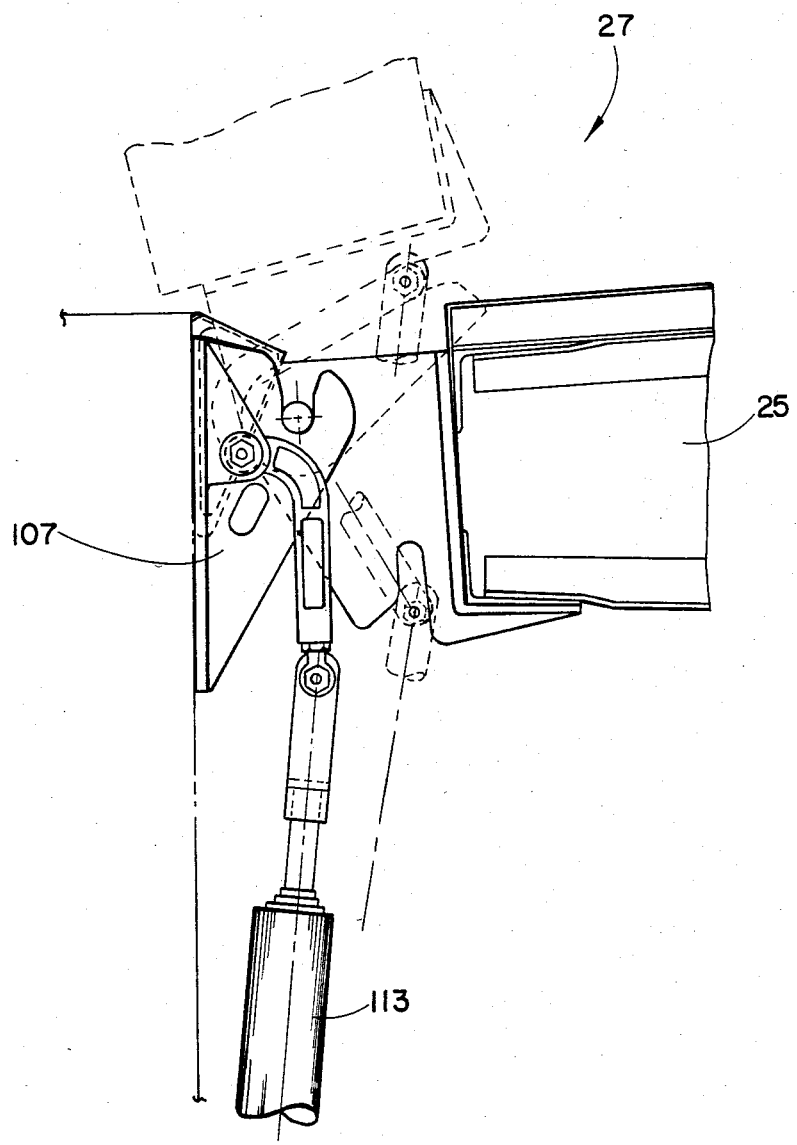
FIG. 12 is a side view illustrating the self-locking actuator hinge fitting of the ramp extension.

Referring to FIGS. 10 and 12, the extension locking means 27 comprises saddle fittings 107 positioned on the ramp aft bulkhead. Fittings 109 located on the forward edge of the ramp extension 25 are adapted to sit in the saddle fittings 107 so that the actuation of a ramp extension lock/unlock selector lever 110 locks the saddle fittings 107 to the extension fittings 109. A ramp extension actuator 113 is operatively associated with a ramp extension actuation hinge fitting 111 which rotates the ramp extension 25 and drives control rods 103 during deployment and retraction of the extension 25.

Figure 13:
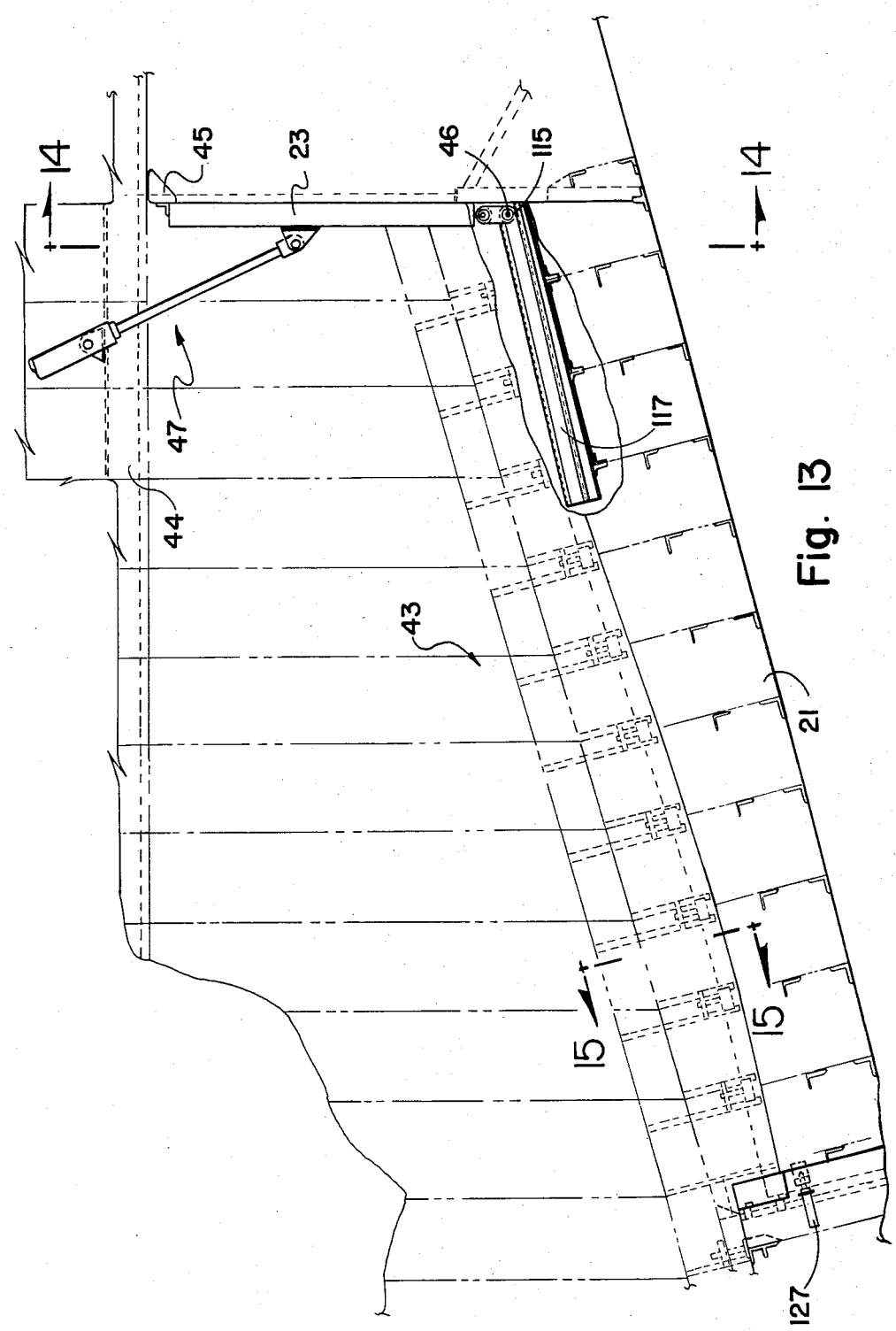
FIG. 13 is a side view, partially in section, of the cargo door according to the present invention.
Figure 14:
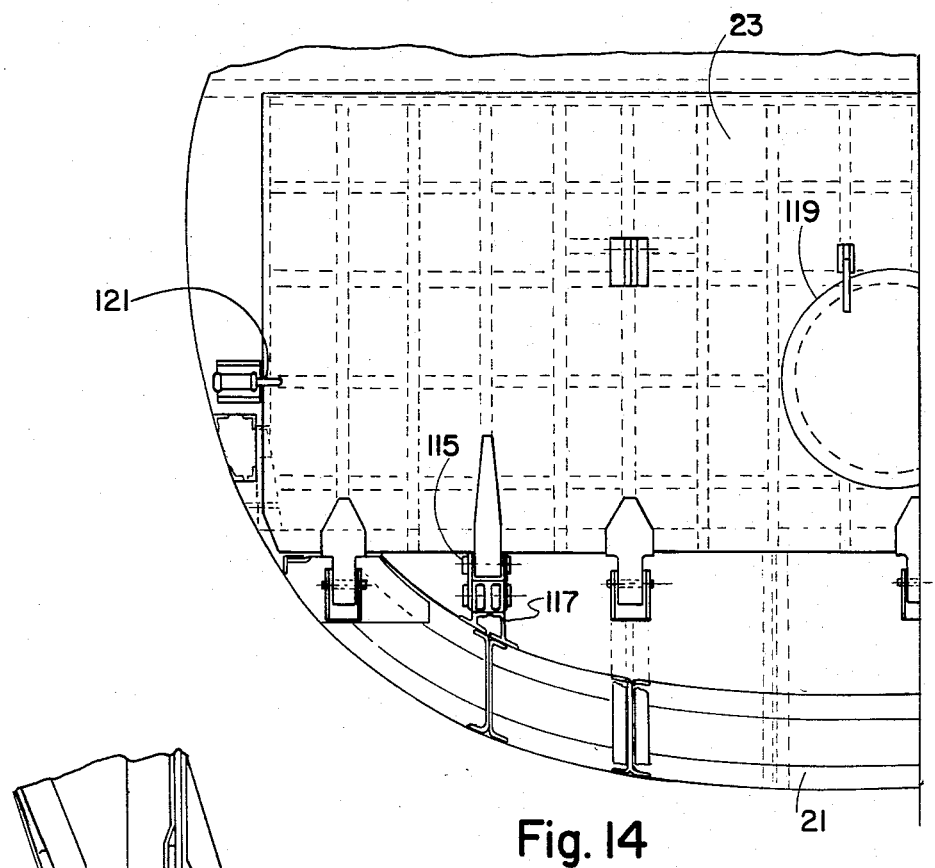
FIG. 14 is a view looking aft of the hinged bulkhead taken along line 14—14 of FIG. 13.
Figure 15:
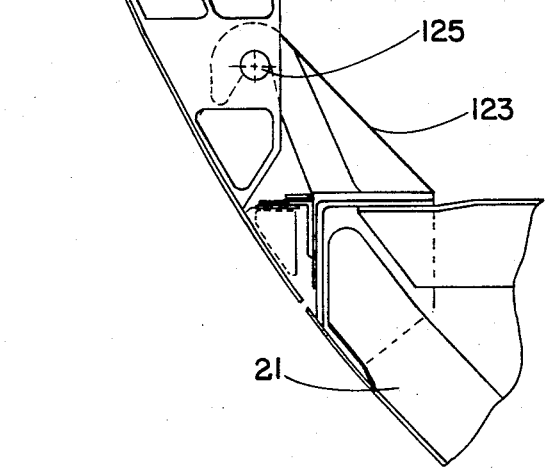
FIG. 15 is a view looking forward of the cargo door locking mechanism.

The cargo door 21, as illustrated in FIGS. 13–15, is opened and closed by folding the hinged bulkhead 23. A roller assembly, 115 affixed at 46 to the bulkhead 23, engages a track assembly 117 positioned on the door 21. When the bulkhead 23 is folded by retracting the piston rod of the actuator 47, the door 21 is raised as shown in FIG. 2.

The hinged bulkhead 23 is provided with a negative pressure vent and access door 119 as shown in FIG. 14. The door 119 permits access to the empennage and unpressured areas in the tail of the aircraft. In order to lock the bulkhead 23 in the unfolded or open position, pins 121 engage the bulkhead 23 along the periphery thereof.

Similar to the cargo ramp locking system, the door locking means 43 comprises a series of cargo door hooks 123 attached to the door 23 and a series of complementary hook engaging means or pins 125 attached to the fuselage 11 adjacent the fuselage-door intersection. Each pin 125 engages a hook 123 during locking of the door 21. Once the door 21 is closed, a door locking pin 127 locks the door 21 in conjunction with the bulkhead pins 121.

Figure 16:
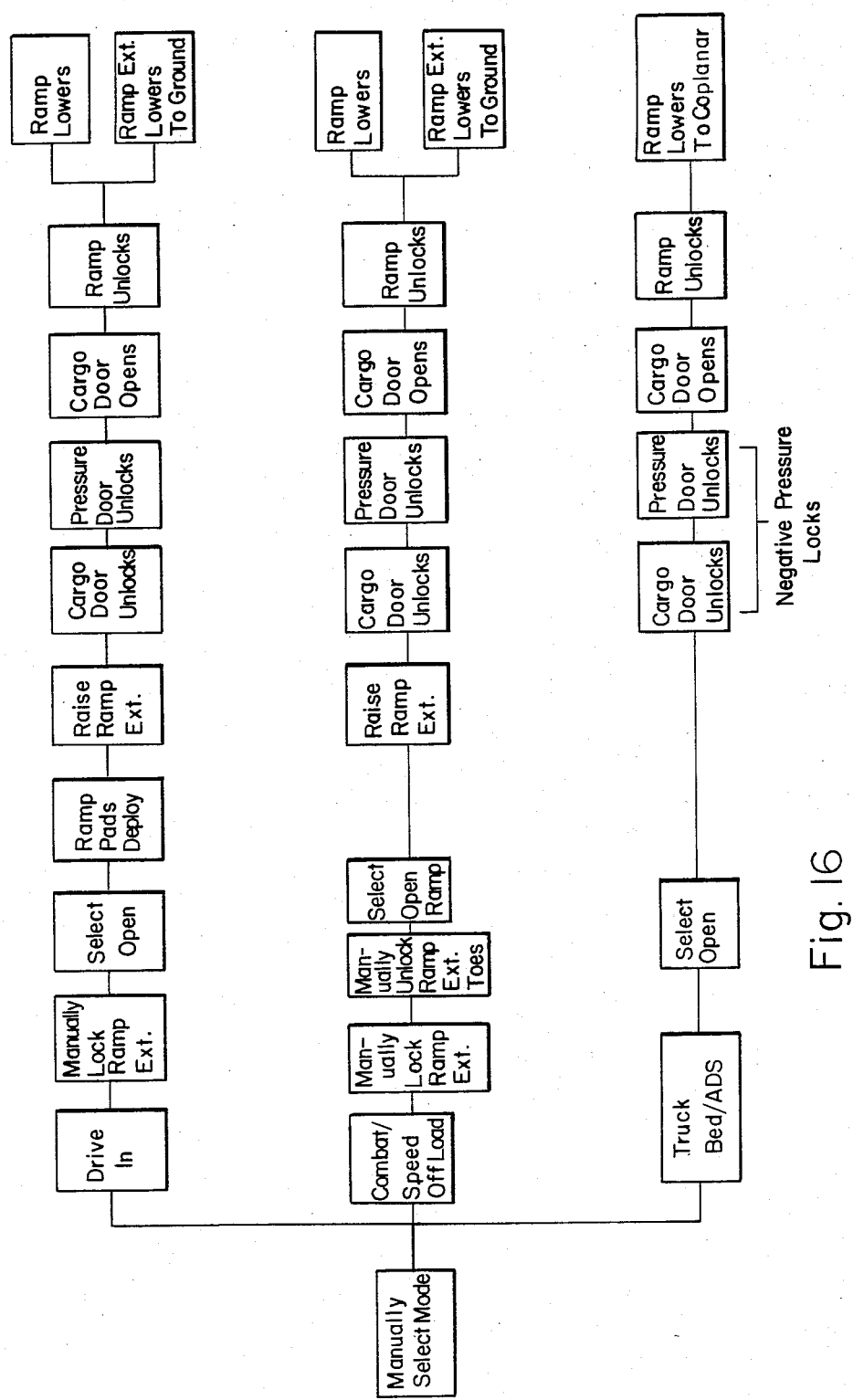
FIG. 16 is a flow diagram illustrating the sequence of operation of the cargo door assembly of the present invention.

The operation of the cargo door assembly 17 is quite simple thus eliminating the room for personnel errors as shown by the flow charts of FIG. 16. To select the drive-in mode, the tether control pin 36 is inserted into the drive-in aperture location in the position guides 34 on the right and left side panel structure. The ramp extension 25 is then locked to the ramp 19 by actuation of the selector lever 110 and the saddle fittings 107 engage the extension fittings 109. This activates the extension actuator 113 to rotate the ramp extension 25 upwards. Concurrently, the extension folding mechanism 101 folds the extension 25 as shown in FIG. 2.

The ramp hinges 49 are manually unlocked and cargo door 21 lifted as actuator 47 folds bulkhead 23. Once the door 21 is lifted up to and into mehcanical uplocks, the traverse actuators 59 move the ramp 19 aft. Once clear of the cargo ramp locking system 39, the ramp 19 is lowered by vertical actuators 32. Concurrently, the ramp extension 25 unfolds and rotates to the deployed position. The ramp actuators 32 are then pressure relieved and the ramp support pads 71 and 99 rest on the ground.

Truck bed, aerial deployment system (ADS) and low altitude parachute extraction system (LAPES) configurations are selected by inserting the tether control pin 36 in the indicated aperture 37 on the right and left hand ramp support structure. The ramp extension lock/unlock lever 110 is rotated to unlock the ramp extension 25 from the ramp 19. The cargo door 21 is then opened with the extension 25 stowed thereon. During the ADS and LAPES operational modes, constant pressure is maintained by the vertical actuators 32 against control pin 36 and the ramp position link 33. During the truck-bed loading and unloading, the ramp-to-fuselage hinges 49 are locked in the extended position.

The combat/speed off-loading configuration is selected by inserting the control pin 36 in the indicated aperture 37 on the right and left-hand ramp support structure. The ramp extension lock/unlock lever 110 is rotated to lock the ramp extension 25 to the ramp 19. The ramp extension toes 95A and 95B are then unlocked from the ramp extension so that the toes 95A and 95B remain stowed on the cargo door 21 during off-loading operations.

When the extension 25 is deployed for combat/speed off-loading, the vertical ramp actuators 32 are stalled out by the control pin 36 before the ramp support pads 71 touch the ground. The ramp extension 25 lowers until a roller assembly (not shown) on the aft end of the extension 25 contacts the ground.

While the invention has been particularly shown and described with reference to a preferred embodiment, it will be understood by those skilled in the art that various changes in form and detail may be made therein without departing from the spirit and scope of the invention as defined by the appended claims.

We claim:

1. A plug-type door assembly for the storage compartment of a cargo aircraft having a fuselage comprising:
   (a) a cargo ramp pivotally mounted for longitudinal as well as outward and downward rotation from a closed position to first, second, and third positions;
   (b) ramp actuator means for lowering and raising said cargo ramp;
   (c) ramp locking means for locking said ramp in the closed position;
   (d) a ramp extension selectively affixed to said ramp;
   (e) a ramp extension locking means for selectively locking said extension to said ramp;
   (f) a cargo door pivotally mounted for inward and upward rotation from a closed to an open position;
   (g) door locking means for locking said door in the closed position;
   (h) a hinged pressure bulkhead, one end being attached to torque deck of the storage compartment, the other end being slidably affixed to said door;
   (i) bulkhead actuator means for folding and opening said bulkhead to lift and lower said cargo door; and
   (j) sealing means for forming a pressure tight seal at ramp, door, pressure bulkhead and fuselage intersections.

2. A door assembly according to claim 1, wherein said ramp locking means comprises:
   (a) a clevis hinge half having slotted holes, said clevis hinge half being affixed to the bulkhead of the fuselage;
   (b) blade hinge half on the forward end of said ramp, said blade hinge half having an aperture for receiving a pin;
   (c) a pin for attaching said blade hinge half to said clevis hinge half to permit the ramp to move longitudinally as well as pivotally with respect to fuselage;
   (d) a series of hooks attached to said ramp
   (e) a series of complementary hook engaging means attached to the fuselage adjacent the ramp-fuselage intersection each for slidably engaging one of said complementary hooks; and (f) ramp traversing means for moving said ramp forward and rearward whereby said ramp actuator means lifts said ramp against the fuselage while said ramp traversing means moves said ramp aft, this aftward movement disengaging said complementary hooks from said hook engaging means to free said ramp for downward rotation to said first, second, and third positions.

3. A door assembly according to claim 2, wherein said hook engaging means further comprise a separate cylindrical pad of low heat treat steel adapted to rest upon a saddle shaped cradle on said hook engaging means to ensure that any wear takes place on said pad; and means for removably affixing said pad to said hook engaging means.

4. The door assembly of claim 3, further comprising:
(a) a series of wedge fittings located along each side of said ramp;
(b) a series of complementary wedge engaging channels on the underside of tne fuselage;
(c) roller bearing on said wedge fitting for guiding said wedge fittings with said channels to align the outboard contour of said ramp and fuselage.

5. The door assembly of claim 4, further comprising:
(a) hinge lock pins for engaging aligned apertures through said clevis and blade halves to lock said ramp in one of said first, second, third, and closed positions, and
(b) means for engaging and disengaging said hinge lock pins to lock and unlock said ramp.

6. The door assembly of claim 5, wherein said ramp actuator means comprises;
(a) a hydraulic actuator for raising and lowering said ramp;
(b) trunnion fitting for mounting said hydraulic actuator to the fuselage;
(c) ramp position control links, one end of which is attached to the fuselage, the other end being attached to said ramp;
(d) a position guide for guiding said ramp position control links; and
(e) tethering means for selectively varying the length of said ramp position control links;

7. The door assembly according to claim 6, wherein said tethering means comprises a control pin for selectively engaging one of a series of apertures along said guide to form a stop for said link.

8. The door assembly according to claim 7, further comprising ramp support pads for supporting the weight of said ramp when said ramp is positioned in the full down position for drive-in loading.

9. The door assembly according to claim 8, wherein said door locking means comprises;
(a) a series of hooks attached to said door;
(b) a series of complementary hook engaging means attached to the fuselage adjacent the fuselage-door intersection, each for engaging one of said complementary hooks;
(c) door engaging locking pin means attached to said ramp for engaging said door when said door is closed; and
(d) bulkhead engaging pin means attached to the fuselage for engaging said bulkhead when unfolded.

10. A door assembly according to claim 9, wherein said bulkhead actuator means comprises:
(a) cargo door roller assembly on the door engaging end of said bulkhead;
(b) cargo door actuation track on said door for engaging and guiding said roller assembly; and
(c) a hydraulic actuator hinged at one end to the fuselage and hinged at the other end to said bulkhead;

whereby the retraction of said actuator folds said bulkhead thus guiding said roller assembly along said track to lift said door and the extension of said actuator opens said bulkhead to close said door.

11. A door assembly according to claim 10, wherein said ramp extension comprises:
(a) a first plate for connection to said ramp;
(b) a bifurcated second plate hingably affixed to said first plate and forming independently movable first and second toe plates;
(c) a wedge shaped toe plate attached to each of said toe plates;
(d) a self-deploying pad attached to each toe plate;
(e) roller assembly attached to each of said toe plates; and
(f) folding means for folding and unfolding said first plate towards and away from said second plate during the deployment and retraction of said extension.

12. A door assembly according to claim 11, wherein said extension locking means comprises:
(a) extension ramp fittings located on the forward facing portion of said first plate;
(b) saddle fittings on the aft portion of said ramp for lockably engaging said plate fittings to selectively lock said extension to said ramp;
(c) means for locking said saddle fitting to engage and disengage said saddle fittings with said extension ramp fitting.

* * * * *